(12) United States Patent
Meissner

(10) Patent No.: US 6,600,237 B1
(45) Date of Patent: Jul. 29, 2003

(54) METHOD FOR CONTROLLING A PLURALITY OF ELECTRICAL LOADS OPERATED AT THE SAME TIME BY A CURRENT SOURCE

(75) Inventor: Eberhard Meissner, Hofheim (DE)

(73) Assignee: VB Autobatterie GmbH (DE)

( * ) Notice: Subject to any disclaimer, the term of this patent is extended or adjusted under 35 U.S.C. 154(b) by 66 days.

(21) Appl. No.: 09/706,628

(22) Filed: Nov. 6, 2000

(30) Foreign Application Priority Data

Nov. 18, 1999 (DE) .......................................... 199 55 406

(51) Int. Cl.$^7$ ............................................... H02M 3/00
(52) U.S. Cl. ........................................... 307/34; 307/41
(58) Field of Search ............................. 307/31–35, 24, 307/41, 60; 320/129

(56) References Cited

U.S. PATENT DOCUMENTS 5,045,712 A * 9/1991 Baggenstoss ................ 307/29

* cited by examiner

Primary Examiner—Fritz Fleming
(74) Attorney, Agent, or Firm—Piper Rudnick LLP

(57) ABSTRACT

In a method for controlling a plurality of electrical loads operated at the same time by a current source using a clocked or pulsed operating current, the instant and/or duration of pulse driving for the operating current of at least one load are synchronized to the operation of the other loads in such a way, and are matched to one another such, that the sum of the currents flowing to supply the loads assumes as constant a value as possible, and both the fluctuations and the rates of change in the sum of the currents flowing to supply the loads are minimized. The clocking or pulsing of the operating current of the electrical loads sets a partial load state for the load, or the load is operated from a power supply having a higher voltage than the rated operating voltage of the load.

11 Claims, 3 Drawing Sheets

METHOD FOR CONTROLLING A PLURALITY OF ELECTRICAL LOADS OPERATED AT THE SAME TIME BY A CURRENT SOURCE

FIELD OF THE INVENTION

This invention relates a method for controlling a plurality of electrical loads operated at the same time by a current source using a clocked or pulsed operating current.

BACKGROUND

Electrical loads are increasingly operated not with a constantly flowing current, but rather using a clocked or pulsed current, even if they are supplied from a DC source. Instead of regulation to a mean and largely constant current, a rapid changeover between on and off mode takes place, with the necessary electrical power being consumed by selecting the pulse duration as an average over time. On the one hand, this enables the power consumed to be matched to the requirements of the function served by the load, irrespective of the voltage currently provided by the supply side, and, on the other hand, it enables smooth regulation of an electric motor or of a lighting means, for example.

The significant spread of this technology in recent years can be attributed to the rapid development of electronic circuit components. By comparison with transistor-controlled circuits, there is a great advantage in the saving of energy (including little complexity for cooling the transistors), costs and installation space.

However, because of the rapid and frequent change between states with a high and a low flow of current (or none at all), pulse technology results in severe changes in the intensity of the flowing current, with steep rising edges for the current. Usually, the instant, the pulse duration and the timing ratio are defined on an individual basis by the component or the control unit associated therewith, without matching to other components being carried out. This means that current pulses and current changes for a plurality of components overlap unexpectedly.

Accordingly, it would be highly advantageous to provide a method for controlling loads operated using a clocked or pulsed operating current which avoids the aforementioned disadvantages.

SUMMARY OF THE INVENTION

Thus, the invention includes a method for controlling a plurality of electrical loads operated at the same time by a current source using a clocked or pulsed operating current comprising: synchronizing instant and/or duration of pulse driving for the operating current of at least one load to operation of other loads; matching the loads to one another such that the sum of currents flowing to supply the loads is substantially a constant value; and minimizing both fluctuations and rates of change in the sum of the currents flowing to supply the loads.

DESCRIPTION OF THE INVENTION

Figure 1:
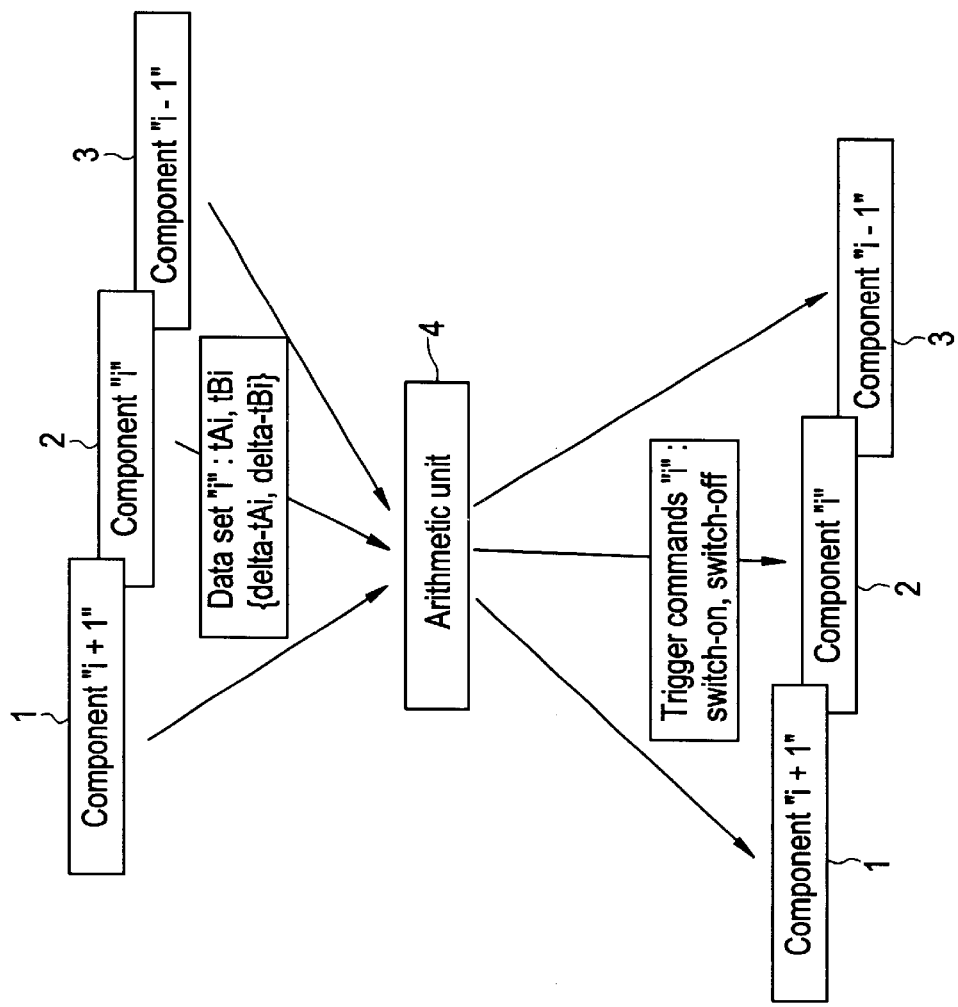
FIG. 1 is a schematic of sets of information flowing from individual electrical components to an arithmetic unit.

The following description is intended to refer to specific embodiments of the invention illustrated in the drawings and is not intended to define or limit the invention, other than in the appended claims.

According to the invention, a reduction in the changes in the total current flowing is achieved if electrical loads are supplied by a current source and operated using a clocked or pulsed current. The measures according to the invention prevent rapid changes in the flowing current from causing electromagnetic interference as a result of capacitive and inductive coupling and as a result of radiation. In addition, the current source is not loaded to a disproportionately large extent if the individual currents flowing add up adversely within a brief period to produce a value which is much higher than the mean current flowing, or if two loads are turned on or off at the same time and there is, thus, a high and rapid change in current.

The effect achieved by coordinating the pulsed operation of the individual loads in accordance with the invention is that the response of the loads is not changed at all or is changed only insignificantly. At the same time, however, electromagnetic interference and loading on the current source is reduced and the voltage of the electrical power supplied by the current source is stabilized.

In the case of a motor vehicle, for example, power is supplied by at least one generator and at least one storage battery. Depending on the design, the generator is not able to react to rapid changes in current. This means that, in the case of such rapid changes in current, the storage battery needs to cushion this load change temporarily. This means that the storage battery is discharged in the event of a rise in current, and is charged in the event of the current being reduced. However, a frequent load change, as in the case of pulsed loads, is associated with losses of electrical power, heats the storage battery, and also result in increased wear on the storage battery. In addition, greater changes in the voltage can impair the operability of loads which react sensitively to such voltage changes. Such impairment is particularly critical in the case of loads which are important for the operational reliability of the vehicle.

According to the invention, the flowing current is kept as ,constant as possible, and, in addition, abrupt changes in the total current flowing are kept as low as possible. The latter case means a lower rate of current change dI/dt, which means that the generator is better able to follow a change in current and the storage battery needs to cushion less of the change in current. The instant and duration of pulse driving for the operating current of at least one load are synchronized to the operation of other loads, and are matched to one another, in such a way that the sum of the currents flowing to supply the loads assumes as constant a value as possible, and both the fluctuations and the rates of change in the sum of the currents flowing to supply the loads are minimized. The operating current of the electrical loads is clocked or pulsed to set a partial load state for the load or to operate the load from a power supply having a higher voltage than the rated operating voltage of the load.

To carry out the method according to the invention, an arithmetic unit assesses the information about the envisaged turn-on state ("off" or "on" or "partial load") of clocked or pulsed electrical loads, ascertains an inventive time sequence and duration for the turn-on pulses, and prescribes the control of the time sequence and of the duration of the turn-on pulses for the loads.

The arithmetic unit is also able to assess the information about the envisaged turn-on state ("off" or "on" or "partial load") of clocked or pulsed electrical loads, to ascertain an inventive time sequence and duration for the turn-on pulses, and to transmit this to the individual loads for their individual control of the time sequence and duration.

The temporal synchronization of the instant and duration of the pulses can be prescribed by a timer which is common to a plurality of loads. The mean operating current of a load can be altered slightly with respect to the actually prescribed/envisaged value. The ratio of turned-on to turned-off durations for the currents of the individual loads need not be selected permanently, but rather may be varied within certain boundaries, with the mean timing ratio ascertained over a multiplicity of on/off pulses essentially corresponding to the required value.

In this approach, each component i=1, 2, ..., n which has a need for electrical power, provides the following information to the arithmetic unit:

A: demand for length of an on-period tAi (sec)
B: demand for length of an off-period tBi (sec)
(optionally, see below C: demand of power or current during an on-period Pi)
(optionally, see below D: information about the current/time transient at the beginning and end of an on-period)

As an alternative to A and B, any other pair of data comprising the same information can be provided, e.g. on:off-ratio and total length of period. The arithmetic unit may convert that data set accordingly.

It is common practice in today's vehicles that electrical components within a vehicle electric system are usually connected to a central controlling unit, especially if a bus system is used, and addresses for use with this bus system are stored and communicated. Therefore, classification of electrical components according to their power demand and/or their power transient when being switched on and off can be done together with the identification of those components upon manufacture of the vehicle. In those cases, there is no need for additional data transfer or sensing, resp., upon operation of the vehicle, provide functions C and D.

In any event, the length of these periods tA1, tB1, tA2, tB2, ..., tAn, tBn is approximated by multiples of an internal time standard of the arithmetic unit. Only with the rhythm of this internal clock are actions triggered. In a simple approach, the arithmetic unit triggers power to be supplied to the components i=1, 2, ..., n (or, alternatively, commands the components to take power) in such a way that the beginning and the end of the on-periods of the components never coincide. By this, amplification of current ramping dI/dt by such coincidents is avoided, and the situation is improved compared to random beginnings and ends of the on-periods, where such coincidents randomly occur.

In a more advanced approach, the arithmetic unit triggers the power supply to the components i=1, 2, ..., n (or, alternatively, commands the components to take power) in such a way that the beginning of the on-period of one component coincides with the end of the on-period of another component. By those coincidents, the current ramping dI/dt is reduced compared to the situation of single component triggering, as ramp-up and ramp-down of the two respective components compensate to some degree.

In a further more advanced approach, the arithmetic unit groups the components in such a way that their power demand during on-time is similar. In other words, the system synchronizes instant and duration of pulse driving. When the beginning of the on-period of one component coincides with the end of the on-period of another component, the current ramping dI/dt is further reduced. If this grouping of components is not possible (e.g. when only one high-power component is present), two (or more) components with lower power demand each can be switched substantially simultaneously to compensate the switching of that component with higher power demand.

For grouping of the components according to their power demand, the requested power needs to be known by the arithmetic unit. This can be done either by measurement of the current flowing by a current sensor, or that information is provided by the respective components to the arithmetic unit (see above, cf. info C), e.g. via a data bus.

Furthermore, switching is not an instantaneous process. If information about the current ramping is available, either by measurement of the current flowing by a current sensor, or when that information is provided by the respective components to the arithmetic unit (see above, cf. info D), e.g. via a data bus, grouping of components can be done according to that information as well.

While coincidence of on-and off-switching of more than one component at the same time may be strictly avoided, the more advanced approaches can be realized only if there is some freedom for variation in the length of the on-and off-periods. Therefore, the algorithm may include some freedom to modify the demands for the length of on-periods tAi and demand for length of off-period tBi of the component i within the same range, e.g. within+/−10%. The allowed freedom of tAi and tBi, namely delta-tAi and delta-tbi (or the allowed freedom of other pairs of data comprising the same information like A and B, e.g. on:off-ratio and total length of period), may either be fixed (data stored either in the arithmetic unit or in the component itself) or may be variable and part of the data set provided from component i to the arithmetic unit together with tAi and tBi.

Making use of that degree of freedom, a more flexible shifting of switching-on and-off events of various components can be provided to avoid not only coincidence of multiple switching-on or switching-off events, resp., at the same time, which would even enhance load-jumps, but, furthermore, to smooth such load-jumps by coincident triggering of a switching-on of one component with a switching-off event of another component.

FIG. 1 shows a schematic of sets of information, flowing from the individual components (1, 2, 3) to the arithmetic unit (4), comprising the on-and off-duration tAi and tBi (and optionally also the freedom ranges delta-tAi and delta-tBi), and the triggering of the components.

Figure 2:
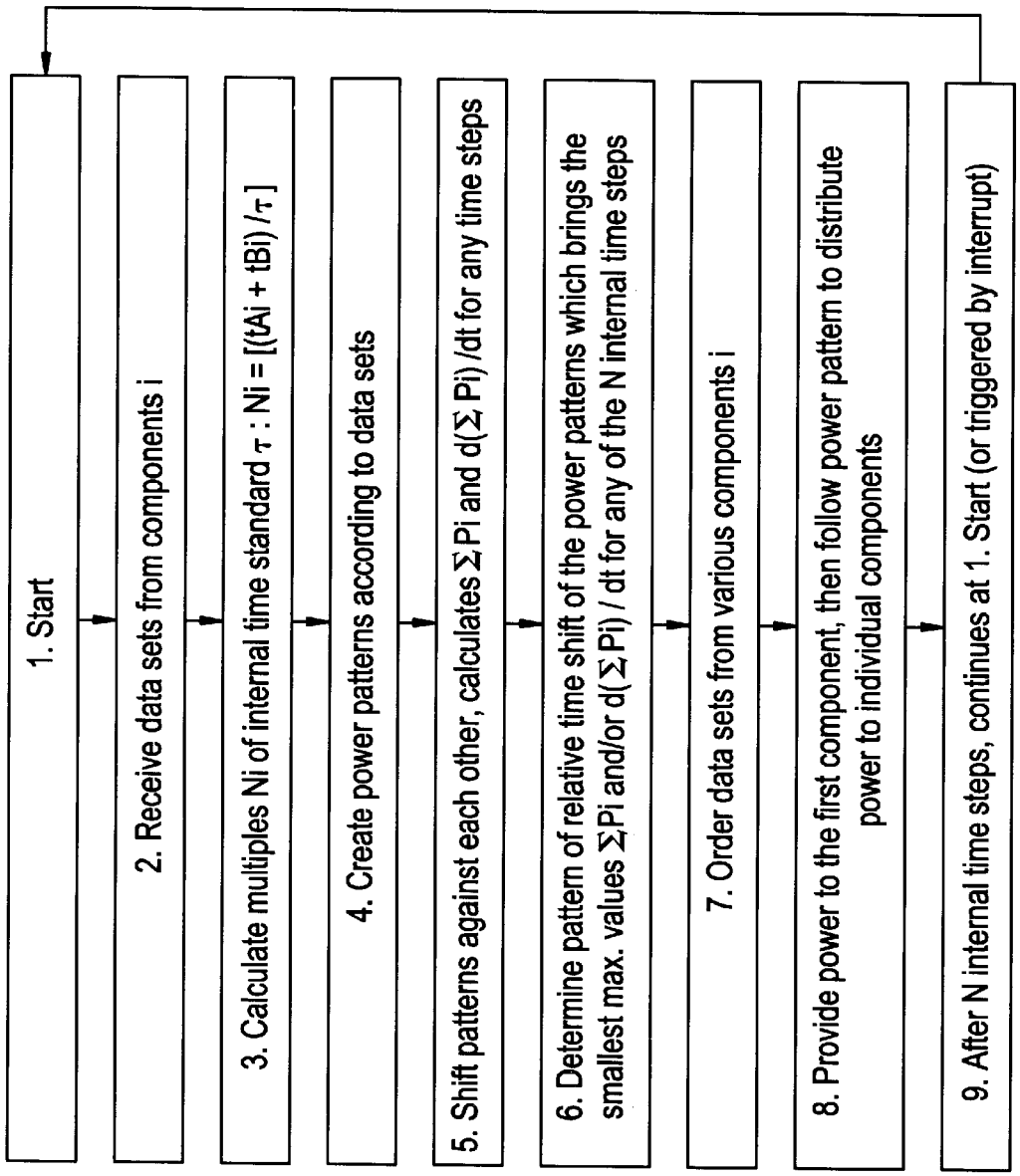
FIG. 2 is a flow diagram of a preferred arithmetic unit processing sequence.

The flow chart in FIG. 2 of one possible nonlimiting example of processing is as follows:

1. Start
2. The arithmetic unit receives the data sets from various components i, comprising tAi and tBi (and optionally also the freedom ranges delta-tAi and delta-tBi),
3. The arithmetic unit calculates the multiples Ni of its internal time standard tau corresponding to those periods: Ni=[(tAi+tBi)/tau] (N.B.: [] represents integer division)
4. The arithmetic unit handles the sets of information from n different components i=1, ..., n with partial different power demands and partial different demands of tAi and tBi. The length of time of the power patterns shifted against each other is the periodicity of the whole power vs. Time profile=N×tau; this is N1×N2×N3×...×Nn in the worst case, which can be taken by default; it can be chosen shorter accordingly if some of the Ni are equal or at least commensurable to others.
5. The arithmetic unit shifts the patterns against each other (time shift) and calculates the overall power demand ΣPi and its change with respect to time d (ΣPi)/dt for any of its internal time standard steps.
6. The arithmetic unit determines that pattern of relative time shift of the power patterns which brings the smallest max. values ΣPi and/or d (ΣPi)/dt for any of the N internal time steps.
7. The arithmetic unit orders the data sets from various components i, e.g. according to their power demand; suitable other order criteria can be the ratio of on-to off-time, the length of either the on-or off-periods, etc.
8. The arithmetic unit provides power to the first components from its list, e.g. to that with the highest power demands and then follows the power pattern to distribute power to the individual components.
9. After N internal time steps, the arithmetic unit continues at 1. Start. This may also be triggered by an interrupt when a new data set is received from one of the components.

According to the invention, the loads can be prioritized in terms of their significance, and the variation in the instants, in the clock periods, in the mean operating current, in the ratio of turned-on to turned-off durations for the currents of a load having relatively low priority can be selected such that the load having relatively high priority has as high as possible an operating voltage available while its operating current is flowing. The loads having relatively high priority are safety-related components, for example. Information is interchanged between loads, energy sources and the arithmetic unit over at least one bus system.

The examples below describe a few applications and refinements of the method according to the invention.

EXAMPLE 1

The vehicle lighting of a vehicle comprised lighting means having a rated operating voltage of 14V and was supplied from a 42V vehicle power supply. In addition, the two headlamps were operated, at 50W each and four position lamps and the number plate illumination at 10W each with an on/off ratio of 1:2 used a clocked current. Since the lighting means reacted very sluggishly to fluctuations in the current, clock frequencies of 50 Hz, for example, were entirely sufficient to prevent operating restrictions.

Figure 3:
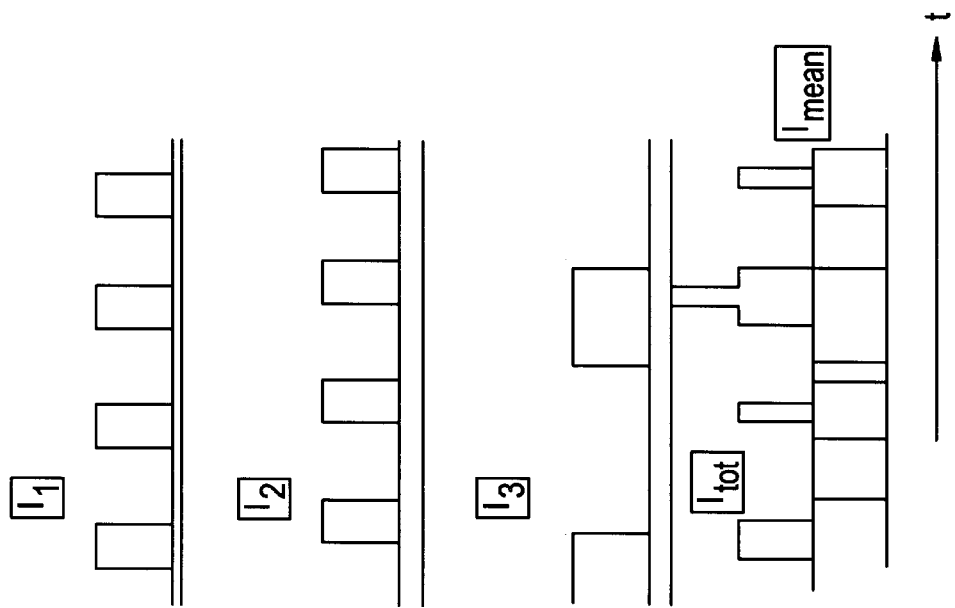
FIG. 3 is a composite of three graphs of three independent unsynchronized circuits using pulsed current as a function of time.

A total of seven lighting means were operated in three independent unsynchronized circuits using pulsed current I1, I2, I3, as shown in FIG. 3, where both the instant of the pulses, given the same pulse duration (cf. I1 and I2), and the pulse duration itself (cf. I1 and I2 against I3) may be different. In this case, the currents overlapped randomly and the total current fluctuated between a multiple of the mean (Itot=I1+I2+I3) and zero (Itot=0). In the phases of above-average currents, this placed a disproportionately high load on the electrical energy sources. By way of example, a battery can supply this load only at a relatively low voltage.

EXAMPLE 2

Figure 4:
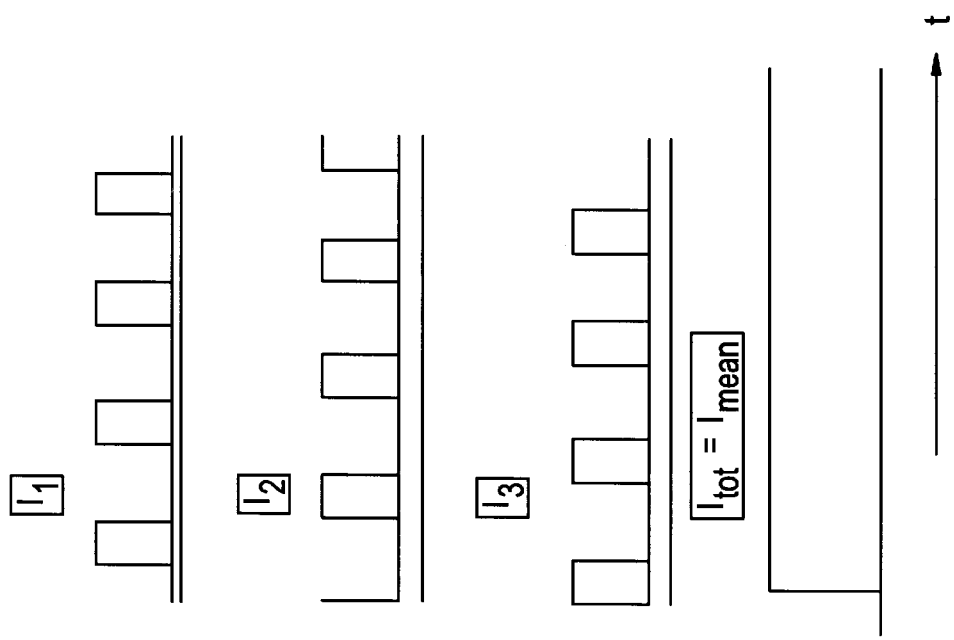
FIG. 4 is a composite of three graphs of three independent synchronized circuits using pulsed current as a function of time in accordance with the invention.

In the case shown in FIG. 4, the invention provided for both the instants and the pulse durations to be matched to one another, and the total current was, therefore, always the same as the mean current. In this case, the electrical power losses were, therefore, lower than in Example 1. The electrical energy source was able to output this current at relatively high voltages, which means that energy was ultimately saved.

Even if FIG. 4 represents an ideal case in which; favorable selection of the parameters eliminates current fluctuations entirely, optimization is similarly possible in such a way that the arising fluctuations in the total current become as small as possible.

EXAMPLE 3

If two loads have a different on/off ratio, then it is generally not always possible to avoid simultaneous turn-on times. However, by skillfully selecting the turn-on and turn-off instants, it is possible to prevent the change in current intensity from occurring at the same time for both loads and, hence, to prevent a substantial jump in the total current intensity. If the pulses are turned on and off in a staggered manner over time, then relatively small jumps in the total current intensity arise. To achieve this, the invention rovides that the on/off ratio or the mean current intensity of the loads can be altered lightly with respect to the required value.

EXAMPLE 4

When two loads have different priorities, and/or when, in particular, the load having relatively high priority requires a relatively high operating voltage for its operation, then the instant and/or the duration of the operating current pulse for the load having relatively low priority is altered, in particular, the instant is shifted and/or the pulse duration is shortened in such a way that, while the operating current of the load having relatively high priority is flowing, the load having relatively low priority receives no operating current or a relatively low operating current. This raises the operating voltage available to the load having relatively high priority and reliably assures its operation.

This case is of particular importance if the load having relatively high priority performs a safety-related function. In a motor vehicle, this is, in particular, an electrically. operated component which influences the chassis in the broadest sense, such as a braking or steering system or a chassis stabilization system.

EXAMPLE 5

In the cases mentioned in Example 4, the instant and/or the duration of the operating current pulse for the load having relatively low priority can additionally be altered. In particular, the instant can be shifted and/or the pulse duration shortened in such a way that the load having relatively low priority receives no operating current or a relatively low operating current even in situations in which, although there is still no operating current flowing for the load having relatively high priority, its operability needs to be assured, in particular, because indications or circumstances suggest that the load having relatively high priority will possibly be or needs to be put into operation shortly. This raises the operating voltage available to the load having relatively high priority and reliably assures its operation.

Although this invention has been described with reference to specific forms of apparatus and method steps, it will be apparent to one of ordinary skill in the art that various equivalents may be substituted, the sequence of steps may be varied, and certain steps may be used independently of others, all without departing from the spirit and scope of the invention defined in the appended claims.

What is claimed is:
1. A method for controlling a plurality of electrical loads operated at the same time by a current source using a clocked or pulsed operating current comprising:

synchronizing instant and/or duration of pulse driving for the operating current of at least one load to operation of other loads;

matching the loads to one another such that the sum of currents flowing to supply the loads is substantially a constant value; and minimizing both fluctuations and rates of change in the sum of the currents flowing to supply the loads.

2. The method as claimed in claim 1, wherein the clocking or pulsing of the operating current of the electrical loads sets a partial load state for the load.

3. The method as claimed in claim 1, wherein the load is operated from a power supply having a higher voltage than the rated operating voltage of the load.

4. The method as claimed in claim 1, wherein an arithmetic unit assesses information about a selected turn-on state ("off" or "on" or "partial load") of clocked or pulsed electrical loads, ascertains a matched time sequence and duration for the turn-on pulses, and sets the control of the time sequence and of the duration of the turn-on pulses for the loads.

5. The method as claimed in claim 1, wherein an arithmetic unit assesses information about a selected turn-on state ("off" or "on" or "partial load") of clocked or pulsed electrical loads, ascertains a matched time sequence and duration for the turn-on pulses, and this information is transmitted to the individual loads for their individual control of the time sequence and duration.

6. The method as claimed in claim 1, wherein temporal synchronization of the instant and duration of the pulses is set by a timer which is common to a plurality of loads.

7. The method as claimed in claim 1, wherein mean operating current of a load is altered with respect to the set value.

8. The method as claimed in claim 1, wherein a ratio of turned-on to turned-off durations for the currents of the individual loads is varied, with a mean timing ratio ascertained over a multiplicity of on/off pulses essentially corresponds to a required value.

9. The method as claimed in claim 1, wherein the loads are prioritized in terms of their significance, and wherein variations in instants, in clock periods, in mean operating current, in ratio of turned-on to turned-off durations for the currents of a load having relatively low priority are selected such that a load having relatively high priority has as high as possible an operating voltage available while its operating current is flowing.

10. The method as claimed in claim 9, wherein the loads having relatively high priority are safety-related components.

11. The method as claimed in claim 1, wherein information is interchanged over at least one bus system.

* * * * *